3,268,651
MOUNTING FOR SURFACE CONNECTIONS TO UNDERGROUND SERVICES WITH MOVABLY ATTACHED SUPPORTING MEANS
David A. Stevenson, Ottawa, Ontario, Canada, assignor to Northern Electric Company, Limited, Quebec, Quebec, Canada
Filed Dec. 11, 1963, Ser. No. 329,687
8 Claims. (Cl. 174—38)

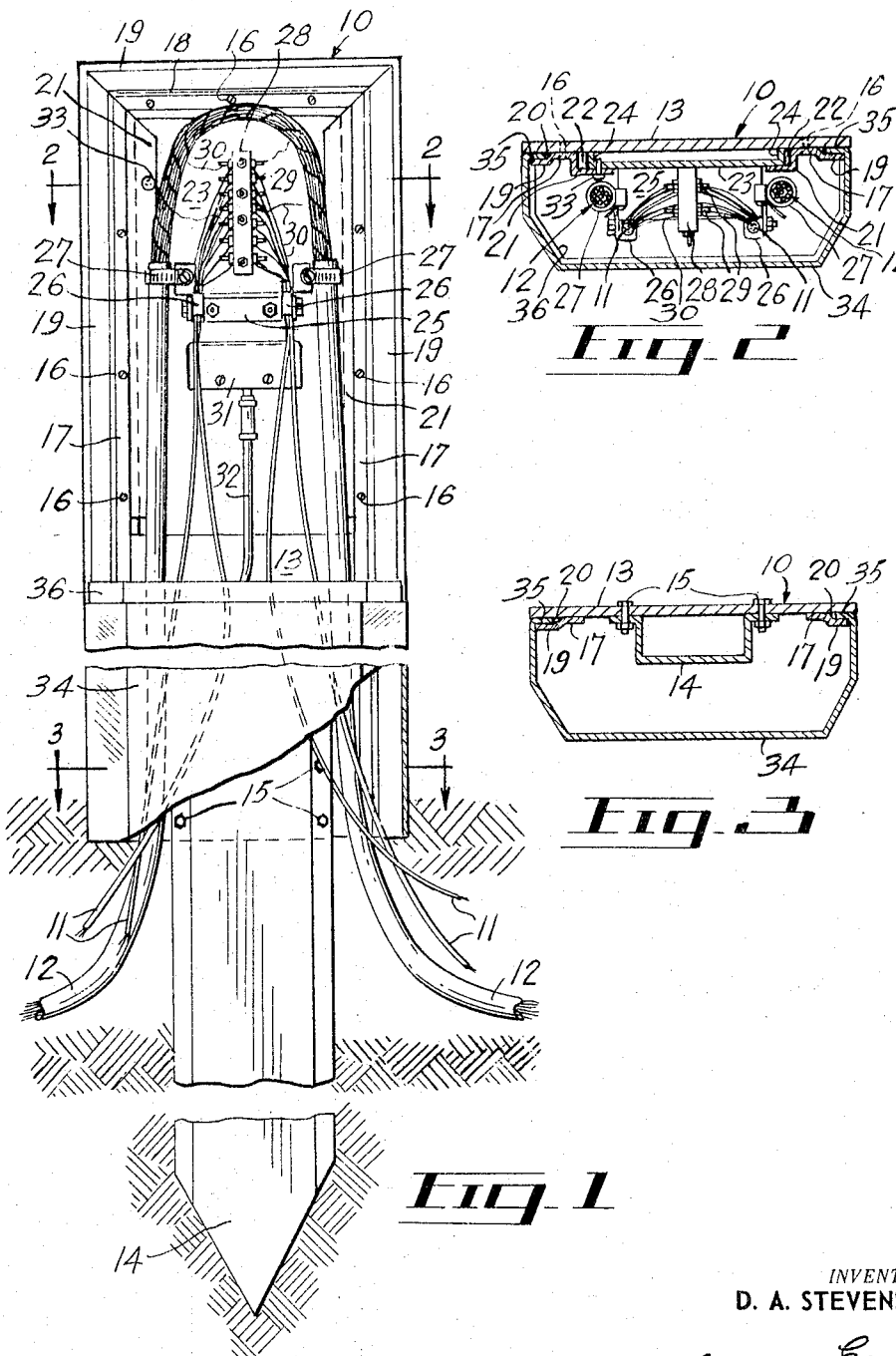

This invention relates generally to mounting members for surface connections to underground services such as telecommunications and electric power cables and the like. More particularly, the invention relates to such mounting members for use where the ground is subject to frost upheaval.

Underground services of the class described are usually brought to the surface of the ground to facilitate installation and maintenance of test and subscriber connections. Since they are exposed, these "surface" connections are generally provided with suitable mounting members for support and protection. In areas where the moisture in the ground may become frozen, particular attention must be paid to the effects of frost upheaval of the ground. Frost upheaval tends to lift the mounting members, and since the underground services are virtually unaffected due to the depth at which they are buried, the resulting relative movement can cause undue strain on the services and the connections.

Previous attempts to overcome this problem were directed to preventing this movement by deeply embedding the mounting members in the ground, and, additionally, by specially constructing the mounting members to resist the lifting effect of frost upheaval. To this end, one prior mounting member was anchored by a horizontal plate below the frost line. Another mounting member of the prior art was isolated from ground movement by encasing that portion of the mounting member extending through the layers of ground subject to frost upheaval, in a grease-filled tube. However, these prior mounting members were cumbersome, difficult to install and, in the latter case, required careful maintenance.

In seeking to overcome these disadvantages, applicant has discovered that particularly satisfactory results are obtained by adapting the mounting member to support the connection such that the mounting member can move in a vertical direction independently of the connection. This provision for relative vertical movement between the connection and the mounting member in accordance with the present invention means that the connection is effectively isolated from the lifting effects of frost upheaval on the mounting member. Indeed, movement of the mounting member under such conditions can be tolerated since such movement can not be transmitted as an undue load to the connection or the underground service.

The realization of a mounting member in accordance with the present invention constitutes a radical departure from the teachings of the prior art since applicant has shown that, contrary to previous beliefs, it is not essential to prevent movement of the mounting member under frost upheaval conditions. As a consequence, applicant's mounting member does not require the elaborate provisions prevalent in the prior mounting member for preventing movement, and it thereby overcomes the attendant disadvantages of such prior mounting member as outlined above.

Applicant's preferred embodiment of the present invention is described below with reference to the accompanying drawing in which:

FIGURE 1 is an elevation view partly in section of a mounting member for connections to an underground telephone cable; and FIGURES 2 and 3 are section views taken along lines 2—2 and 3—3, respectively, in FIGURE 1.

The drawing illustrates a mounting member 10 for connections between subscriber service wires 11 and an underground telephone cable 12. The cable is extended above ground level in the form of a loop as is common practice to make it more accessible and to allow the connections to be made at a sufficient height to keep them well above any surface water on the ground.

The support means of the mounting member 10 consists of a supporting plate 13 having an elongated member 14 extending from one end and secured thereto by bolts 15. The member 14 has a channel cross-section for rigidity as shown in FIGURE 3 and is pointed at its free end so that it can be driven into the ground to locate the mounting member in an upright position beside the exposed loop of cable 12 as shown.

Mounted on plate 13 adjacent its vertical edges by screws 16 or any other suitable fastening means, are a pair of thin elongated strips 17. Another strip 18 is similarly mounted adjacent the top edge of plate 13. The outer edges 19 of these strips are offset from the surface of plate 13 as shown in FIGURES 2 and 3 to form therewith an outwardly-facing peripheral channel 20, the purpose of which is described hereinafter. Offset portions 21 are also provided along the inner edges of the upper portions of strips 17 to form with the surface of plate 13 a pair of inwardly-facing vertical channels 22 as shown in FIGURE 2.

Forming the mounting means for the connections is a backing member comprising a plate 23 having two opposite edge portions 24 bent substantially perpendicular to the plane of the plate. A bracket 25 is fastened to plate 23 and carries clamps 26 and 27 for securing the service wires 11 and cable 12, respectively, to the plate 23. Also mounted on plate 23 and providing means for connecting the subscriber service wires to the cable 12 is a terminal block 28 having terminals 29 to which individual conductors 30 from the wires 11 and cable 12 are connected. The junction box 31 and cable 32 illustrated in FIGURE 1 are representative of a connection to a television cable. Bending the edge portions 24 of plate 23 both increases the stiffness of the plate and, although not specifically shown for the purpose, provides a clearance to facilitate the installation of fastening means for the attachments to the plate.

The plate 23 is positioned as shown in FIGURE 2 with the bent edge portions 24 slidably disposed in guide means formed by the vertical channels 22. Thus, plate 23 is retained in contact with the supporting plate 13 by the offset portions 21 of strips 17 and yet the plates are free for relative movement therebetween. In most instances the cable 12 is capable of supporting the weight of plate 23, wires 11, bracket 25 and the other elements of the connections, and there is no need of any vertical support from the supporting plate 13. If, however, the cable 12 or other underground service must be assisted in sustaining the weight of the connections, the plate 23 can be connected to plate 13 by a yieldable device such as the shear pin 33 shown in the drawing to extend through plate 23 and the left-hand strip 17 on plate 13. The shear pin 33 will be more fully defined hereinafter.

The mounting member 10 is also provided with a housing for protecting the connections from external hazards such as the weather. The housing consists of two covers of which only the lower cover 34 is shown in the drawing. The upper cover, which is removable to permit access to the connections has been omitted for the purpose of clarity since it is the same as lower cover 34 except that its upper end is closed.

Referring to FIGURES 2 and 3, the housing as exemplified by lower cover 34 is substantially U-shaped in cross-section to provide sufficient interior space for the cable, wires and connections. The free edges of the cover 34 are turned toward each other to form flanges 35 which are slidably receivable in the portions of the peripheral channel 20 formed by the offset portions 19 of strips 17 to secure the cover 34 on plate 13. The upper cover (not shown) is the same except that it has a similar flange extending across its closed top end to engage the portion of channel 20 formed by strip 18. The lower ends of channel 20 on either side of plate 13 are filled in to form stops (not shown) for the lowermost position of cover 34. A shield strip 36 (FIGURE 1) is provided on the inside of cover 34 at its upper end to prevent moisture from seeping through the joint between the two covers when the upper cover has been installed.

Consider now the operation of the mounting member. The mounting member 10 is shown in FIGURE 1 installed under normal ground conditions with plate 23 positioned near the top of the supporting plate 13. When the ground is subject to upheaval under frost conditions, the effect on the mounting member is to lift plate 13 relative to cable 12. However, the only connection between the supporting plate 13 and the cable 12, wires 11, and the connections therebetween, is through plate 23 to which the latter are rigidly secured. And since plate 23 is vertically slidable with respect to plate 13 within channels 22, plate 13 is free to move vertically upwards independently of the connections between wires 11 and cable 12. As a result, no undue loads are imposed on the elements of the connections by reason of such movement.

In the situation where the shear pin 33, or other suitable yieldable device, is used to assist the cable 12 in supporting the weight of the plate 23 and the connections, the shear pin is designed to yield when a predetermined lifting force, which is tolerable to the connections, is exerted thereon by the upward movement of plate 13. The plate 13 is then free to continue its upward movement independently of the plate 23, etc., as above.

Although the mounting member 10 has been described above for use with a telephone cable only, the mounting member could be used at the same time for connections to another underground service such as an electric power cable simply by utilizing the opposite side of the supporting plate 13.

It is evident from the foregoing that this mounting member is more suitable for use under frost upheaval conditions than the prior mounting members which had to be secured against any movement. It is further evident that numerous variations thereof will be immediately apparent to those skilled in the art whereby the essence of the present invention, namely, the adaption of a mounting member for vertical movement independently of the connection, may be utilized. Accordingly, the present invention is not to be limited to the single preferred embodiment described but is to be extended to all equivalent embodiments within the scope of the following claims.

What is claimed is:

1. A mounting member for making a service connection to an upward extension of an underground service where the ground is subject to frost upheaval which comprises a mounting means, service connecting means attached to said mounting means, and support means in contact with the ground, said mounting means being movably attached to said support means to enable relative vertical movement therebetween whereby the connection is effectively isolated from the lifting effects of frost upheaval on the support means.

2. A mounting member for making a service connection to an upward extension of an underground service where the ground is subject to frost upheaval which comprises an elongated support means, said support means being provided with an end portion in contact with the ground, a backing member, securing means for securing the upward extension of said underground service to said backing member, connecting means mounted on said backing member for establishing the service connection with said underground service, and means mounting the backing member on said support means for relative vertical movement therebetween whereby the connection is effectively isolated from the lifting effects of frost upheaval on the support means.

3. A mounting member for making a service connection to an upward extension of an underground cable where the ground is subject to frost upheaval which comprises an elongated support means, said support means being provided an end portion in contact with the ground, means forming a pair of parallel spaced vertical channels and connected to said support means, a backing plate slidably positioned within said channels, cable extension securing means mounted on said backing plate, and terminal means mounted on said backing plate to establish the service connection with the upward extension of said underground cable, whereby the connection is effectively isolated from the lifting effects of frost upheaval on the support means.

4. A mounting member in accordance with claim 2 wherein said support means is provided with vertical guide means and said backing member slidably engages said vertical guide means.

5. A mounting member in accordance with claim 4 wherein said vertical guide means comprises spaced parallel channels and said backing member comprises a plate having parallel edge portions, said parallel edge portions being positioned within said spaced parallel channels.

6. A mounting member as defined in claim 2, further comprising a yieldable means connecting said backing member to said support means, said yieldable means preventing relative movement between said backing member and said support means up to a predetermined stress limit.

7. A mounting member as defined in claim 6 wherein said yieldable means comprises a shear pin extending from said backing member to support means.

8. A mounting member in accordance with claim 3 wherein a shear pin extends from said backing plate into the means forming said channels, said shear pin being yieldable in the presence of a force in excess of a predetermined force moving said support means relative to said backing plate.

References Cited by the Examiner

UNITED STATES PATENTS

| | | | |
|---|---|---|---|
| 1,840,582 | 1/1932 | Hubbell | 220—3.7 X |
| 2,875,915 | 3/1959 | Buckels | 220—3 |
| 3,033,912 | 5/1962 | Phillips | 174—38 |
| 3,164,668 | 1/1965 | Skubal | 174—44 X |
| 3,180,920 | 4/1965 | Fletcher et al. | 174—60 X |

LEWIS H. MYERS, *Primary Examiner.*

JOHN F. BURNS, ROBERT K. SCHAEFER,
*Examiners.*

J. F. RUGGIERO, *Assistant Examiner.*